(12) United States Patent
Ferman

(10) Patent No.: US 6,485,243 B1
(45) Date of Patent: Nov. 26, 2002

(54) MOTOR VEHICLE LOAD CARRIER

(75) Inventor: Magnus Ferman, Värnamo (SE)

(73) Assignee: Industri AB Thule, Hillerstorp (SE)

( * ) Notice: Subject to any disclaimer, the term of this patent is extended or adjusted under 35 U.S.C. 154(b) by 0 days.

(21) Appl. No.: 09/696,073

(22) Filed: Oct. 25, 2000

(30) Foreign Application Priority Data

Oct. 25, 1999 (SE) .............................................. 9903853

(51) Int. Cl.$^7$ ................................................. B60P 3/06
(52) U.S. Cl. ...................................... 414/462; 224/520
(58) Field of Search ............................... 224/518, 519, 224/520, 521; 414/462

(56) References Cited

U.S. PATENT DOCUMENTS

| | | | | |
|---|---|---|---|---|
| 4,695,218 A | | 9/1987 | Boyer ......................... | 414/462 |
| 4,775,282 A | * | 10/1988 | Van Vliet .................... | 414/462 |
| 5,137,411 A | | 8/1992 | Eul et al. ..................... | 414/462 |
| 5,431,522 A | * | 7/1995 | Ross ........................... | 414/462 |
| 5,456,564 A | * | 10/1995 | Bianchini ................... | 414/462 |
| 5,567,107 A | | 10/1996 | Bruno et al. ................ | 414/462 |
| 5,938,395 A | * | 8/1999 | Dumont, Jr. ................ | 414/462 |
| 6,007,290 A | * | 12/1999 | Schulz et al. ............... | 414/462 |
| 6,095,387 A | * | 8/2000 | Lipscomb .................... | 224/485 |
| 6,123,498 A | * | 9/2000 | Surkin ......................... | 414/462 |

FOREIGN PATENT DOCUMENTS

| | | |
|---|---|---|
| DE | 43 30 001 A1 | 3/1995 |
| GB | 2 304 663 A | 3/1997 |
| WO | WO 98/09841 | 3/1998 |

\* cited by examiner

Primary Examiner—Janice L. Krizek
(74) Attorney, Agent, or Firm—Samuels, Gauthier & Stevens, LLP

(57) ABSTRACT

The present invention relates to a load carrier for motor vehicles, which load carrier is designed to be attached to a tow bar device mounted at the rear of the vehicle and which is equipped with additional, electrical lights supplementing the original lights of the vehicle, said load carrier arranged to be at least partly moveable to an aside open position in order to allow opening of a rear door on the vehicle. The novel features are that the opening position may be assumed with the aid of an electric motor (10), that the engine current supply is obtained from one of the pins of the regular switch of the tow bar device of the vehicle, and that its transmission is reversible by means of an electric reversing device.

2 Claims, 6 Drawing Sheets

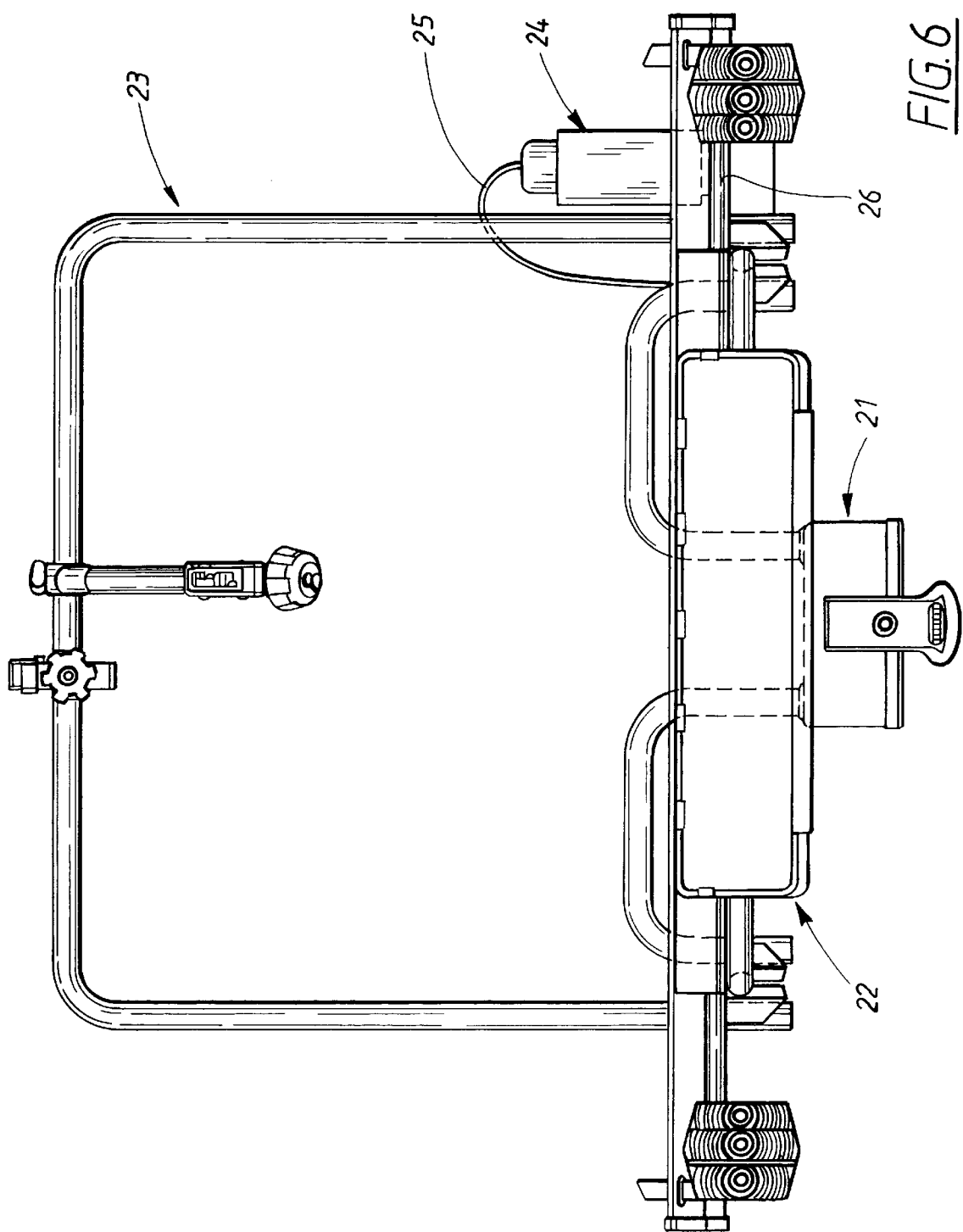

MOTOR VEHICLE LOAD CARRIER

TECHNICAL FIELD

The present invention relates to a load carrier for motor vehicles, which load carrier is designed to be attached to a tow bar device mounted at the rear of the vehicle and which is arranged to be at least partly movable to an aside open position in order to allow opening of a rear door on the vehicle.

BACKGROUND ART

A large variety of load carriers are marketed today, which are intended for mounting on the exterior of vehicles, particularly passenger cars, in order to increase the vehicle load capacity. Some of these load carriers are adapted for attachment to a tow bar device mounted at the rear of the vehicle. One problem arising in connection therewith is, however, that the load carrier and its cargo obstruct the rear vehicle door, preventing it from being opened to make objects inside the car accessible. The only solution to date has been to disconnect the load carrier from the tow bar device. Some load carriers are constructed to allow them to assume an opening position, which in most cases involves pivoting the load carrier in a downward rearward direction, known in the art as "tilting". However, this is an inconvenient operation, since the tilting devices often are difficult to reach, dirty, and tiresome to operate.

DISCLOSURE OF INVENTION

The present invention solves the above problem in an elegant way while at the same time no additional demands on the vehicle or its tow bar device become necessary. In order to achieve this, the load carrier is arranged in such a manner that its opening position may be assumed with the aid of an electric motor, that the engine current supply is obtained from one of the pins of a regular electric trailor connector of the vehicle, and that its transmission is reversible by means of an electric reversing device. In an easily accessible and simple manner, the user of a load carrier in accordance with the present invention may tilt the load carrier to its opening position and back by actuation via electrical switches.

In order to eliminate the risk that the load carrier tilts while the vehicle is moving, the current supply to the motor may be arranged such that the pin of the electric connector is under tension only when the vehicle is stationary.

In the cases when the load-carrier is arranged to be moved aside by means of pivoting, with a ball-shaped tow means as the pivot centre, the motor advantageously is a linear motor that is attached to the load carrier, and the linearly movable part of the motor preferably exerts its action against the shank of the tow bar, underneath the ball.

In other cases, when the load carrier is arranged to be moved aside owing to its load-receiving platform being arranged to turn relative to an attachment part mounted on the tow bar device, about a pivot axis located essentially adjacent the tow bar device, the motor advantageously is of the type having a rotating output shaft and is arranged on the load-receiving platform, said shaft acting via a reducing gear transmission against the attachment part mounted on the tow bar device.

In still other cases, when the load carrier is arranged to be moved aside owing to a part of the load-receiving platform with the load resting thereon being arranged to be folded upwards by pivoting about a pivot shaft located at the end of the load carrier remote from the tow bar device, the motor advantageously is of the type having a rotating output shaft, said motor being arranged on the non-foldable platform part and the output shaft of the engine being connected to the foldable platform part via a reducing gear transmission.

BRIEF DESCRIPTION OF DRAWINGS

Additional advantages and characteristics of the invention will become apparent from the embodiments described in the following and shown in the attached drawing figures and wherein, FIG. 6 shows the modified load carrier of FIG. 5 in a view from behind.

MODE FOR CARRYING OUT THE INVENTION

Figure 1:
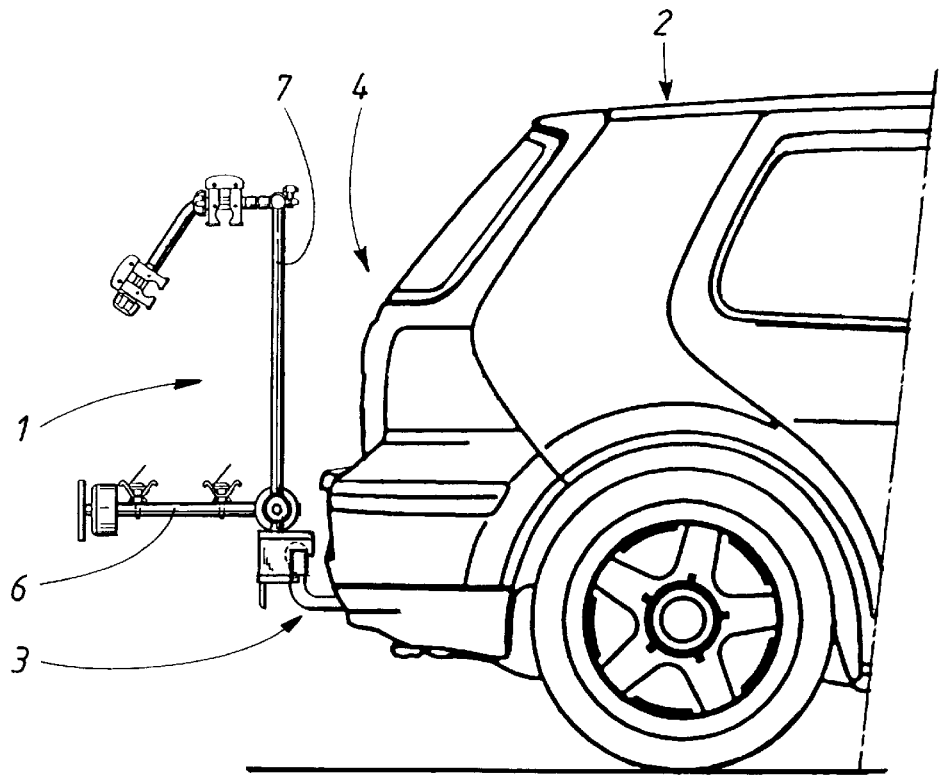
FIG. 1 shows a load carrier mounted at the rear end of a motor vehicle, the load carrier assuming the normal position of transportation
Figure 2:
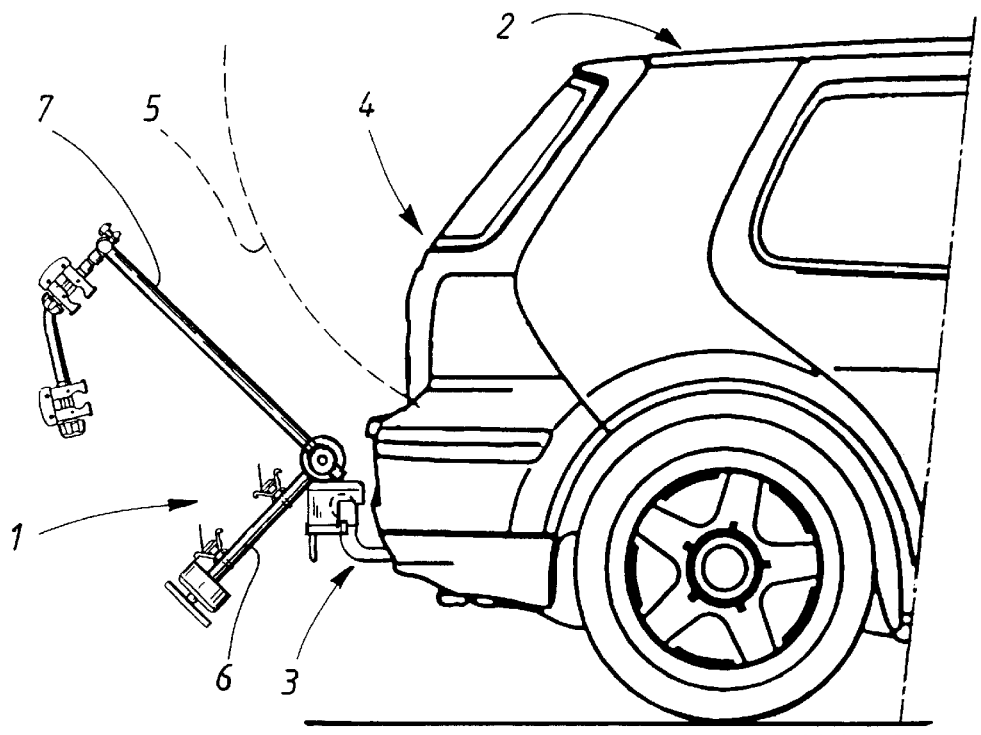
FIG. 2 shows the mounted load carrier of FIG. 1 but in a tilted position.

As appears from FIGS. 1 and 2, the invention relates to load carriers 1 of the kind that are attached to a coupling device or tow bar device 3 located at the rear of a vehicle 2. The load carrier, which in accordance with the shown example is a bicycle rack intended for two bicycles and of a prior-art design not to be described herein in more detail, since its structure is irrelevant to the inventive idea, is shown in FIG. 1 in the position of transportation. The vehicle has a rear door 4, which opens upwards, the lower edge of said door, upon opening of the latter, describing a curve 5 defining the area above which the space must be freely accessible. In FIG. 2, the platform 6 and the rack 7 of the load carrier have been tilted rearwards/downwards to allow free access to the desired space.

Figure 3:
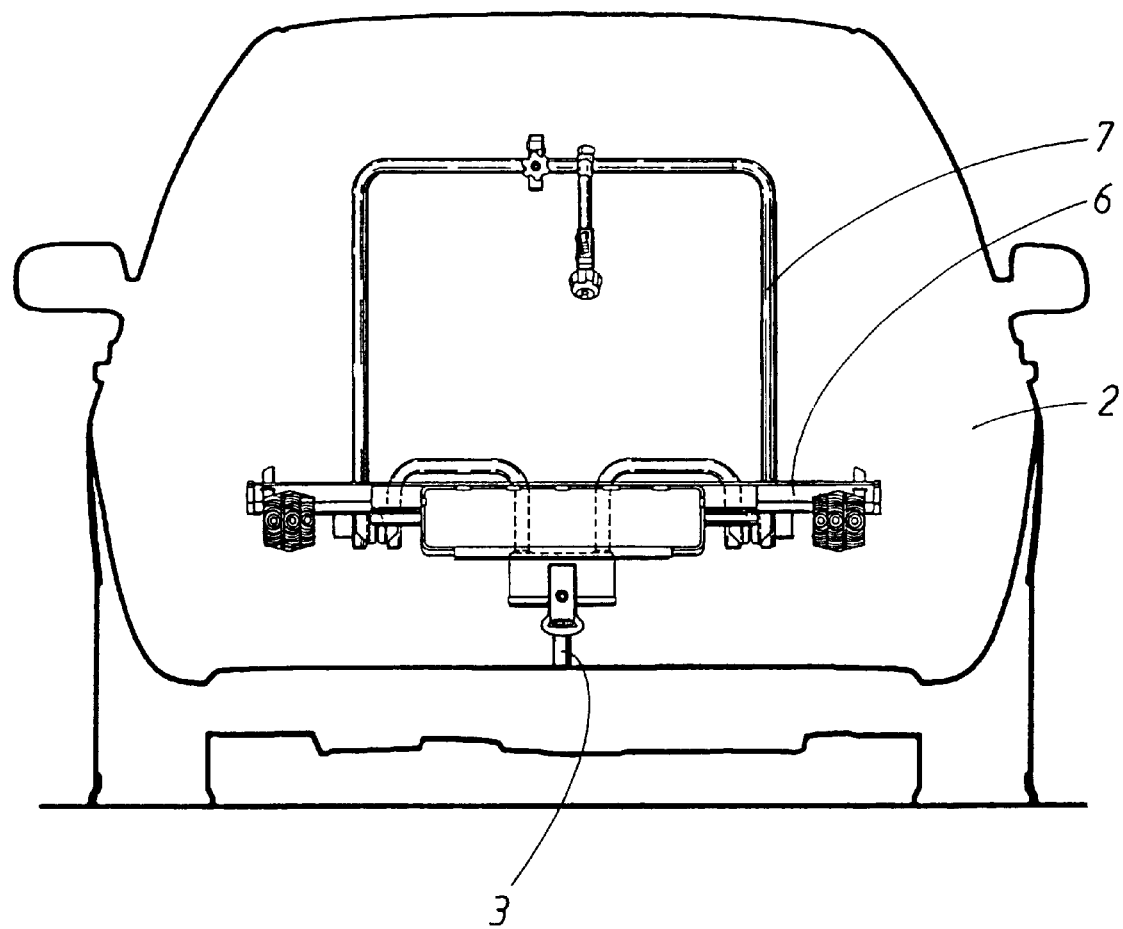
FIG. 3 shows the load carrier of FIG. 1 as seen in a rear view of the vehicle.

FIG. 3 shows the vehicle 2 schematically in a rear view and the location relative to the vehicle 2 of a load carrier 1 in position of transportation.

Figure 4:
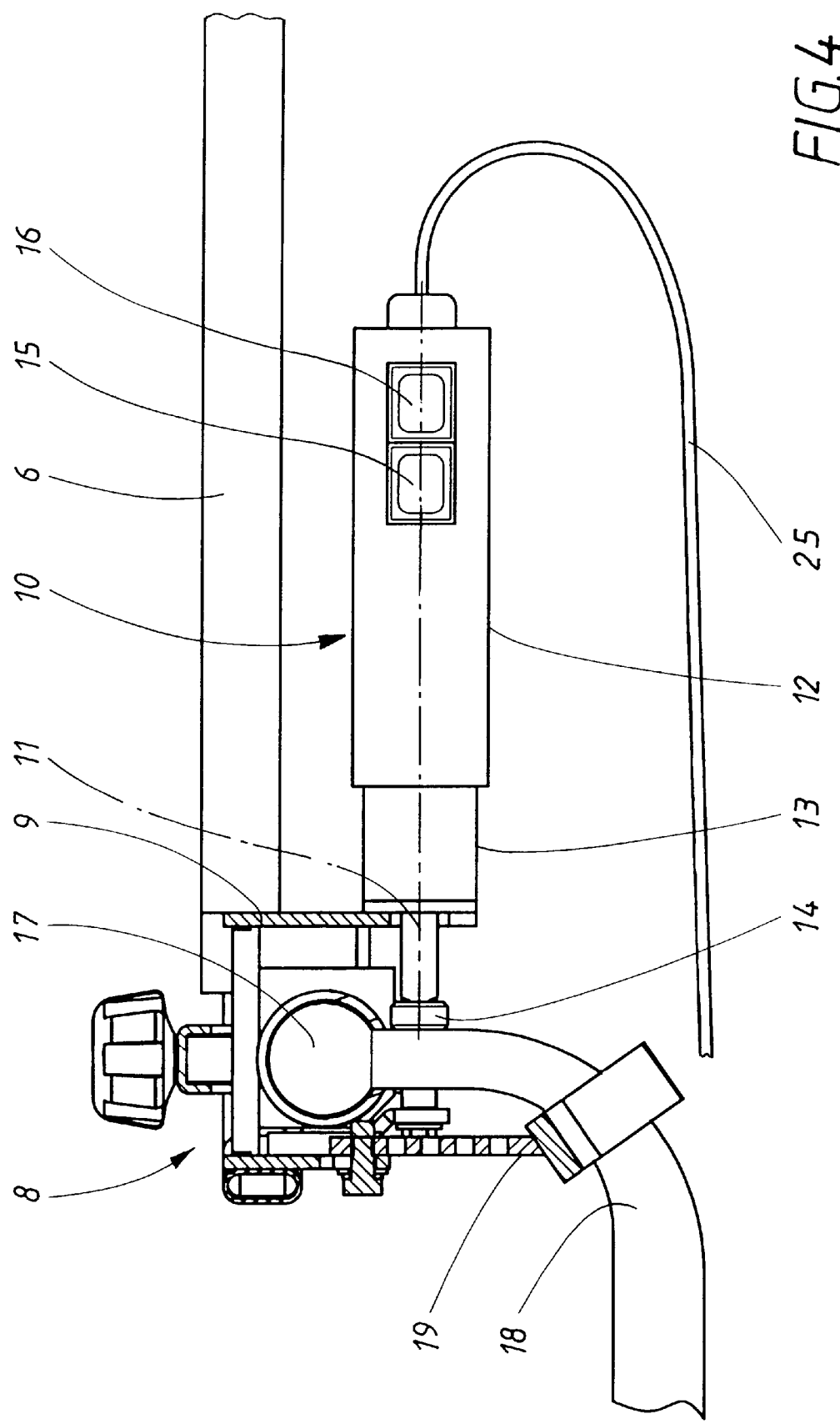
FIG. 4 shows a part of a load carrier, more precisely an attachment part for attachment of a ball-shaped tow bar device, and a motor associated therewith.

The conventional way of allowing tilting of load-holding racks is by tilting, using the ball-shaped tow bar device as the pivot centre. FIG. 4 illustrates part of a load-holding rack including a platform 7 and a tow-ball attachment 8 of a prior-art design, such as Model 989 marketed by the Thule company and comprising locking clamping jaws enclosing the ball. Underneath the platform 7, attached to a flank portion 9 that is part of the platform, there is arranged a first electric motor unit 10 of a design known per se. The electric motor unit 10 is of a kind known as a linear motor, i.e. it has a linearly travelling output shaft 11. In the present case, the drive motor 12 proper has a rotating output shaft but via a transmission 13, the rotary motion is converted into a linear motion of the shaft 11. At the extreme end of the shaft 11, a pressure shoe 14 is arranged. To actuate the motor for movement inwards and outwards, respectively, two switches 15 and 16, respectively, are arranged on the motor 12. The switches 15 and 16 are of the kind that close the circuit when exposed to pressure and open the circuit when the pressure ceases. When tilting the load-holding rack the switch 15 is depressed and consequently closing the circuit, whereby the shaft 11 is retracted into the motor. The support from the shank 18 of the ball 17 to the load-holding rack thus is withdrawn and the lower end of the platform 7 therefore sinks so as to rest against the ground as the ball attachment 8 pivots about the ball 17. When the platform and the load resting thereon (not shown in the drawing figure) assume a position out of the range of the door, the switch 15 is deactivated and the tilting movement is stopped. When the door eventually is reclosed and the load carrier is to resume the position of transportation, the switch 16 is depressed and the shaft 11 travels outwards relative to the motor. Because the movement of the shaft causes the pressure shoe 14 to abut against the shank 18 of the ball 17, the platform 7 and the load carrier are again lifted to the position of transportation. The motor unit preferably is provided with limit switches, which are activated in the respective end positions, as well as with current-limiting devices to prevent the generation of too powerful currents in case of heavy loads. In accordance with the embodiment of FIG. 4, the load carrier is provided with a stabilizing guide fork 19 straddling the shank 18. The guide fork prevents non-desirable lateral turning movements in the position of transportation and also serves as a stop means to limit the upwards movement of the platform. It is not, however, essential to the invention.

Current is supplied to the electric motor unit 10 via a wire 25 comprising two conductors, which are connected to an electric trailer connector in the vehicle via the wire bundle generally provided to energize the lights. Suitably, one of the two conductors is grounded while the other one is connected to a conductor, which is arranged to be continuously supplied with electrical energy from the battery, such as the contact pins of the rear lights. In case the vehicle is equipped with a contact having a pin that is energized only when the vehicle is not moving, this is of course a preferred arrangement, since it means that tilting may be effected only when the vehicle is stationary. To reverse the motor, the two switches 15 and 16 of the motor must be designed and connected in such a manner that it suffices to connect the switches to ground and the positive pole to ensure that the latter are connected to the motor poles in such a manner as to allow reversing, i.e. the current flows in one direction upon tilting and in the opposite one for return movement. The wiring thus becomes easy, the switches being located on or in close vicinity to the motor.

Figure 5:
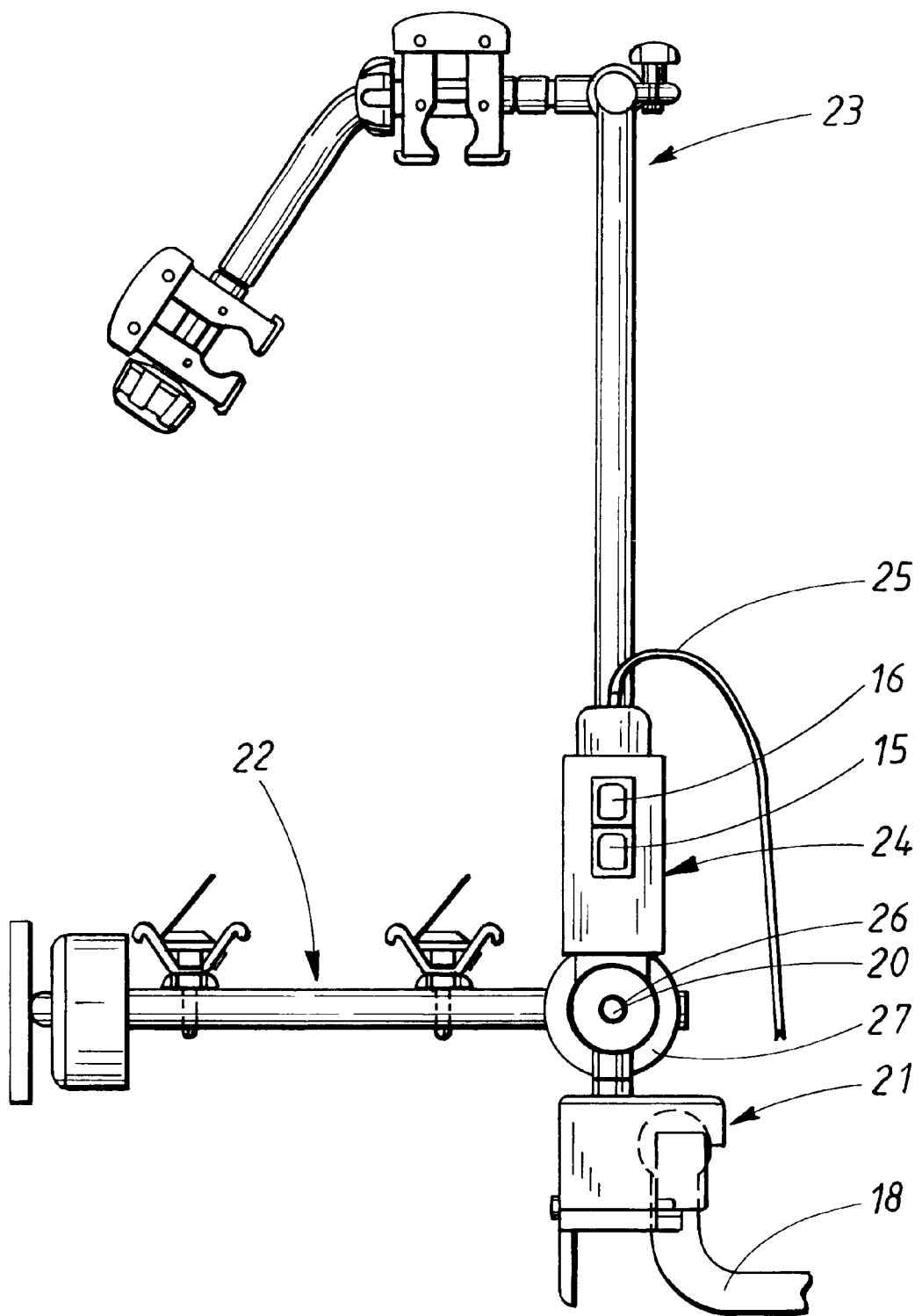
FIG. 5 shows a modified load carrier, wherein the tilting means is an articulation joint between an attachment part and a platform part.

FIGS. 5 and 6 show a modified embodiment of the invention used together with a load carrier wherein tilting has been made possible via an articulated joint 20 located between an attachment part 21, which preferably is of the same nature as the one described previously, and a load-receiving platform 22, which is coupled to a rack 23 of prior-art design and intended to support bicycles. The attachment part 21 is mounted on a ball-shaped tow bar device 17, which is arranged on a shank 18. A second electric motor unit 24 is mounted at the joint 20, said unit being attached to the platform 22 and its rotating output shaft 26 being connected to the attachment part 21 via a gear box 27. Upon actuation of the motor, the two parts, viz. the platform 22 and the attachment part 21 thus are turned relative to one another, and the tilting movement is effected about pivot shaft 20 in the same manner as shown in FIG. 2.

Figure 7A:
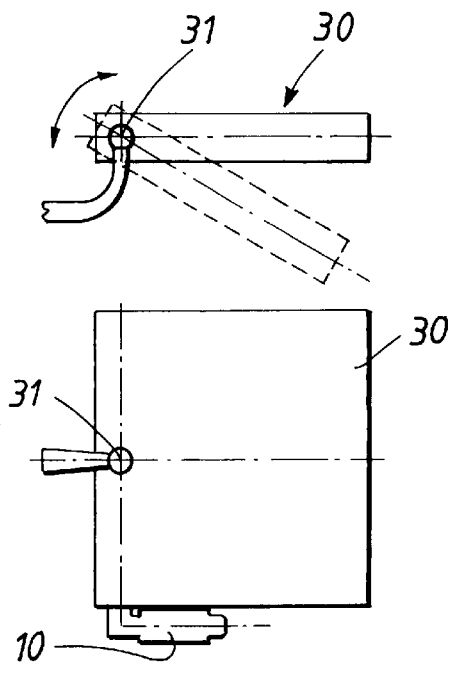
FIGS. 7a–7d show four different tilting-pivot arrangements.
Figure 7B:
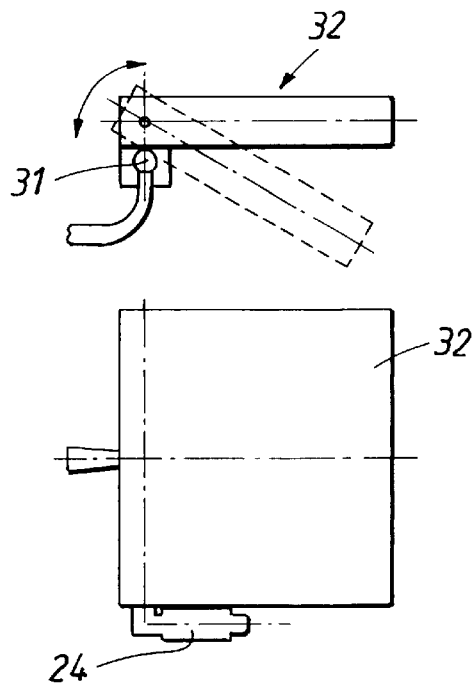
Figure 7C:
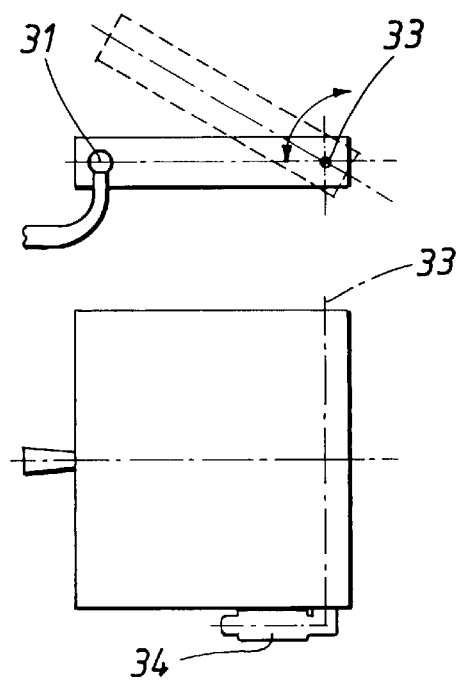
Figure 7D:
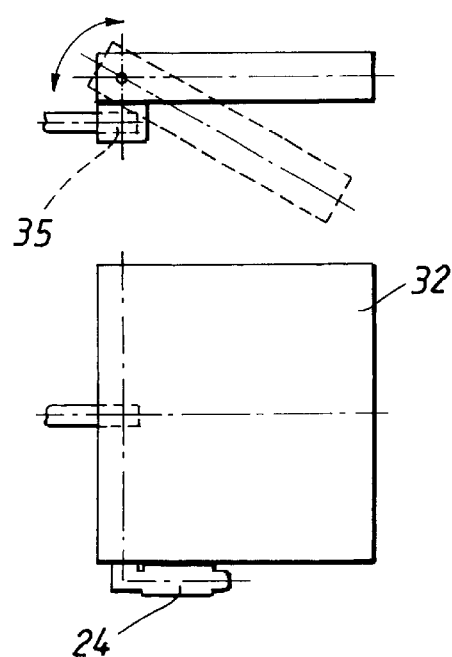

FIG. 7 shows schematically four different tilting-arrangement varieties: 7a shows tilting of a platform 30 about a spherical tow bar device 31, FIG. 7b shows tilting of a platform 32 similar to the platform of FIG. 5, about a pivot shaft located between the platform and an attachment part on a spherical tow bar device 31, FIG. 7c shows tilting about a pivot shaft 33 located at the extreme outer end of the platform, the motor unit 34 being located on the non-tilt part of the load carrier, and FIG. 7d shows a variety, according to which the vehicle is not equipped with a spherical tow bar device but merely with a push-in unit of prior-art kind used generally in some countries instead of a spherical tow bar device and projecting rearwards from the vehicle, the platform being, however, in principle similar to that of FIG. 7b. However, the attachment part in this case is different and more precisely adapted to be attached to the push-in unit.

The invention is not limited to the embodiments described above and illustrated in the drawings. For example, the load carrier could be of a different kind from a bicycle rack. In addition, the current supply could be connected to a contact pin controlled from within the vehicle. In this case, the motor unit could be of a kind that automatically reverses at the end positions. Also, it is suitable that the current limitation in the motor is adapted to the maximum current in the outlet. In vehicles, where the electrical connection of the draw hook is formed with contact pins the tension of which may be controlled from the driver's seat, both poles of the motor could be connected in the connector designed to control the tilting movement upwards and downwards from the driver's seat. Also, the output shaft of the linear motor could be formed with length-adjustment facilities for optimum precision.

What is claimed is:

1. A load carrier for a motor vehicle having original lights electrically powered by an engine current supply, said load carrier is designed to be attached to a tow means mounted at the rear of the vehicle and which is equipped with additional electrical lights supplementing the original lights of the vehicle, said load carrier has a load-receiving platform being arranged to be at least partly moveable by means of pivoting, with a ball carried by a shank of a draw bar on the tow means as the pivot center, to an aside open position in order to allow opening of a rear door on the vehicle, wherein the carrier is moved into said open position with the aid of an electric motor powered by the engine current supply, said motor comprises a linear motor having a linearly movable part, the motor is attached to the load carrier, and the linearly movable part of the motor exerts its action against the shank of the draw bar, underneath the ball, the engine current supply is obtained from one of the pins of a connector associated with the tow means of the vehicle, the engine current supply is available to power the motor only when the vehicle is stationary, and the electric motor operates via a transmission that is reversible by means of an electric reversing device.

2. A load carrier for a motor vehicle as claimed in claim 1, wherein the motor is actuated by switches located at the motor.

* * * * *